United States Patent Office 3,674,507
Patented July 4, 1972

3,674,507
VOLUME-INFLATED FREEZABLE PRODUCT PRESERVABLE IN THE FRESH STATE AND A PROCESS FOR MANUFACTURING SAME
Daniel Carasso, Paris, France, assignor to Societe Anonyme dite: Compagnie Gervais-Danone, Courbevoie, France
Filed Oct. 24, 1969, Ser. No. 869,185
Int. Cl. A23g 5/00
U.S. Cl. 99—136
11 Claims

ABSTRACT OF THE DISCLOSURE

A milk based insufflated product having a volume increase factor of 1.4 to 2.0 and containing milk, cream, sugar, coloring matter and essences in combination with a 0.1–1% of a stabilizer against syneresis, about 0.2–1% of a stabilizer for insuring an insufflated structure and about 0.2–3% of at least one starchy substance.

BACKGROUND OF THE INVENTION

Field of the invention

Figure 1:
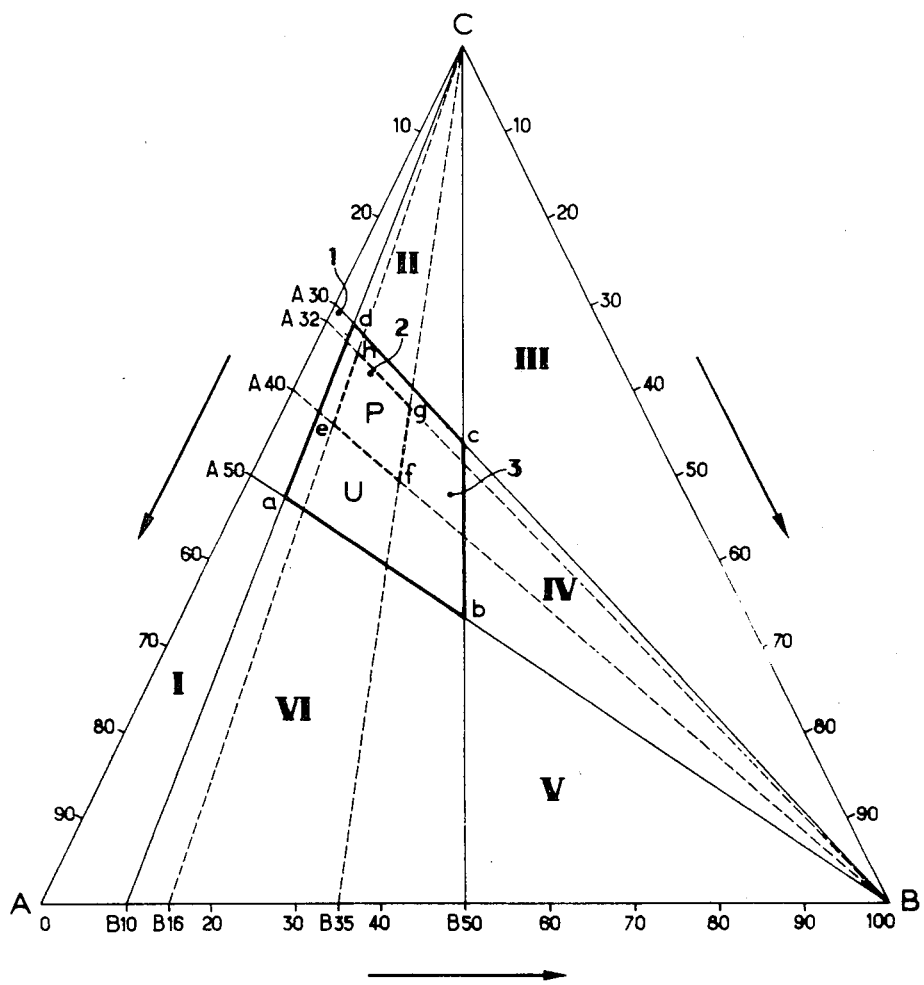

The present invention is a new puffed milk product for preservation in the fresh state and suitable for "fresh" consumption or consumption after chilling in the freeze compartment of a refrigerator. This product additionally offers the property of being reversible, that is, it can be cold stored and dechilled several times without any pronounced syneresis or destruction of its original structure occurring.

Prior art

The disadvantages of prepared products up to the present, especially ready-to-eat ice creams and similar foods reside in the fact that they are prepared and distributed in the chilled or frozen state. In fact, these frozen products are essentially made up of milk, fresh cream, sugar, aromatic agents, etc., and stabilizing agents or stabilizers. Their aerated structure is obtained by indirect "puffing" or inflation, that is, by mixture of a portion of sterilized cream containing all the ingredients except fresh cream, with another portion of fresh cream previously whipped (or aerated) by means of a suitable gas, or by direct inflation, that is, by direct introduction of a finely divided gas into the basic cream structure of the goods.

The stabilizers and insufflation contribute to the formation and preservation of the obtained structure, but until now the subsequent chilling treatment at the end of the manufacturing process has been the main factor essentially ensuring the maintenance of the insufflated structure in the distributed product until the time of consumption of the product. Thawing out of such frozen products causes the breakdown of their structure and a further direct refreezing no longer allows them to recover their original structure as a consequence. They therefore present the disadvantage of having to be kept frozen or chilled without interruption from the instant of their manufacture until the instant of consumption, which means the whole period of storage and distribution usually known as the "cold series." Furthermore, preservation of such products in an expensive special packing or in an ordinary refrigerator is only satisfactory for a limited period of time.

Numerous stabilizers have hitherto been used as adjuvants, especially ammonium salts of the polyacrylic acids, carboxymethylcellulose, carboxymethylalginates, gelatin, etc., but frozen products prepared in this way still must always be subjected to a chilling treatment in the final stage of their manufacture on an industrial scale.

These products as hitherto prepared offer a further disadvantage arising from the necessity for a final treatment itself and the preservation in the chilled state. As a matter of fact, they are constituted of a natural or reconstituted aqueous milk base mixture containing all the other constituents of the formula used either in their dissolved state or in an emulsion. Since the mixture is never perfectly homogeneous, the formation of ice crystals can be observed on the one hand and of magma on the other hand offering a lower freezing point in accordance with the laws of cryoscopy.

From the freezing stage until the time of consumption, a period of time which may be considerable, frozen products are the seat of convection currents of thermal origin whose effect is to develop some ice crystals already present in the mixture by a phenomenon of cryoconcentration, such ice crystals being able furthermore to weld themselves together to form a consolidated mass unpleasant to the taste and conducive to deterioration of the product structure.

The object of the present invention is to remedy the aforesaid disadvantages.

DETAILED DESCRIPTION

In order to overcome the disadvantages inherent in the known products, the present invention is an insufflated lactic product differing in its characteristics from known products. This product can be distributed in the fresh or "cool state" (4 to 8° C.=39 to 47° F.) and preserved in the consumer's refrigerator within the usual guaranteed limits and times for this class of goods, namely 8 to 10 days at a temperature from 0 to 10° C. (32 to 50° F.). The milk product of the invention may be consumed either "fresh" or frozen, after an adequate stay in the freezer of a domestic refrigerator at a temperature of −5 to −20° C. (23 to −4° F.), and it is, moreover, reversible.

These characteristics, especially the reversibility, are obtained through the novel combination with the product of three groups of stabilizers, as follows:

(1) Gelatin to prevent syneresis;
(2) Natural gums and/or carragheenates to ensure maintenance of the insufflated structure;
(3) Starchy substances.

As a result of the employment of this combination of stabilizers, the original structure of the insufflated product remains unchanged throughout the period of its cool storage.

Moreover, after freezing, the product comprises a fine crystallization of ice crystals which do not have enough time to grow through cryoconcentration.

Lastly, the product is reversible, that is to say, it can be frozen and thawed several times in succession without changing its organoleptic properties and, particularly, its structure.

Naturally, the proportions of the stabilizers are important, It is also essential that they form part of a special formula specifically well known. This formula, namely the makeup of the milk product, comprises the customary basic ingredients, namely, fresh or powdered milk, or skim milk, fresh cream, sugar such as saccharose, glucose, coloring agents and essences (flavors) to which the stabilizers are added.

The ingredients entering into the composition of the product may be distributed into three groups:

(A) water,
(B) absorbent dry substances (ADS), that is, total dry extract (TDE) after subtraction of the total fatty substances (TFS), these absorbent dry substances containing, in particular, sugars, thickeners, aromas, colorings, stabilizers, etc.

(C) water-repellant substances or fatty substances (FS) derived from milk or other ingredients.

Another factor contributing to obtention of the structure of the product of this invention is the insufflation which helps to provide the desired structure for the product, including its overall good organoleptic qualities. Insufflation is effected most frequently by introduction of air or of a finely divided inert gas into the original mixture submitted to suitable stirring.

The following diagrams in the drawing will help to better define and understand the composition of the basic ingredients of the product.

FIG. 1 represents a triangular diagram showing the composition of the product of the invention, in which:

Peak A corresponds to 100% absorbent dry substance.
Peak B corresponds to 100% fatty substance.
Peak C corresponds to 100% water.
Side AB, in the direction of the arrow shows the proportion:

$$\frac{B \times 100}{AB}$$

that is $$\frac{TFS}{ADS+TFS}$$

expressed as a percentage of the total weight of the product;

Side CA, in the direction of the arrow shows the proportions:

$$\frac{A}{A+C} \times 100$$

that is $$\frac{ADS}{ADS+water}$$

expressed as a percentage;

Side CB in the direction of the arrow shows the proportion:

$$\frac{B}{BC} \times 100$$

that is $$\frac{TFS}{TFS+water}$$

expressed as a percentage.

Furthermore, ADS+TFS=TDE, that is "total dry extract," and the straight lines parallel to AB indicate at each of the respective points of any particular line the identical TDE contents, these contents ranging from 0 to 100% for the straight lines taken successively from C up to AB.

Area I bounded by ($ACB_{10}$) indicates a zone in which the insufflation is effected deficiently;

Area II bounded by ($dCc$) indicates a zone in which crystallization is not sufficiently fine;

Areas III, IV and V bounded respectively by ($cCB$), ($cBb$ and ($bBB_{50}$) indicate zones in which a buttery taste is predominant, area III corresponding, moreover, to a defective crystallization, and area V to a defective insufflation;

Area VI bounded by ($B_{10}abB_{50}$) indicates a zone in which insufflation is defectively effected, the taste of the product being, moreover, unpleasant;

Area U demarcated by the quadrilateral ($a, b, c, d$) shows a serviceable zone, that is, a zone corresponding to formulations of the ingredients according to which the product of the invention can be prepared with the desired overall structure.

Area P demarcated by quadrilateral ($e, f, g, h$) indicates the preferable zone for manufacture, namely the zone corresponding to the formulations which procure the structure of the product of the invention in the best conditions.

Points 1, 2, 3 correspond respectively to the proportions of the ingredients entering into the formulas of Examples 1, 2, 3 below.

Flan type products are found in Area II for TDE contents lower than about 30%.

Mousse type products are found in Areas III and IV for TDE contents from around 40% to around 70%.

This triangular diagram set up in accordance with laboratory surveys allows determination of the necessary restrictions to be applied to the formulation of components for obtaining the product structure, insufflated or not, according to the invention. Thus:

(1) To obtain a cold manufacture, a sufficient insufflation rate, that is, a ratio of product volume after insufflation to product volume before insufflation of approximately 1.25 to 1.3 m. the ratio TFS/(TFS+ADS)×100, that is 100 TFS/TDE must be greater than or equal to 10% (straight line C–$B_{10}$) (Area I), and the ratio 100 ADS/(water+ADS) must be less than or equal to 50% (straight line B–$A_{50}$) Area VI);

(2) To obtain a fine crystallization the ratio 100 ADS/(water+ADS) must be greater than or equal to 30% (straight line B–$A_{30}$ (Area II);

(3) A ratio 100TFS/TDE which is greater than 50% (straight line C–$B_{50}$) must be avoided because of the pronounced butter taste imparted to the product (Areas III, IV, V).

These conditions correspond to Area U and define a very wide range of possible products, though preferably use is made of Area P determined under the following respective conditions:

$$\frac{ADS}{water+ADS} \times 100 \geq 32\% \text{ (straight line B–}A_{32}\text{)}$$

$$\frac{TFS}{TDE} \times 100 \geq 16\% \text{ (straight line C–}B_{16}\text{)}$$

$$\frac{TFS}{TDE} \times 109 \leq 35\% \text{ (straight line C–}B_{35}\text{)}$$

$$\frac{ADS}{water+ADS} \times 100 \leq 40\% \text{ (straight line B–}A_{40}\text{)}$$

These conditions determine the proportions of the components which have to be used in preparing a product to have the same structure as that of the product according to the invention.

Figure 2:
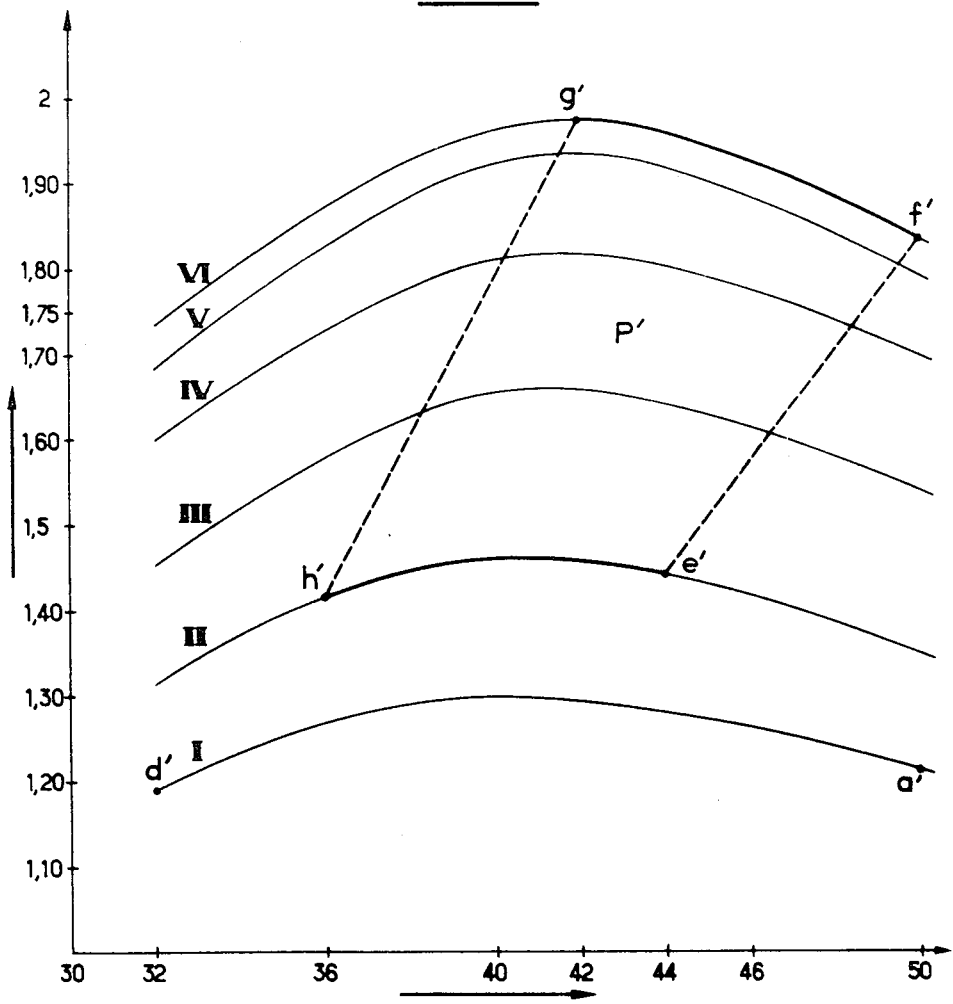

FIG. 2 corresponds to insufflation effected in a Hobart mixer with the aid of nitrogen and mechanical stirring, but it is clear that any other insufflation process can be used, especially a "blender-insufflator." Insufflation takes place cold, that is at a temperature lower than 20° C. (64° F.), under conditions which allow reaching the insufflation rate required and selecting for a given temperature the duration of such insufflation. Thus:

The ordinates in the direction of the arrow indicate in increasing rate of insufflation.

The abscissae in the direction of the arrow indicate the TDE content expressed as a percentage of the total weight of the product.

Curves I, II, III, IV, V, VI correspond respectively to the ratios 100 FS/TDE for 10%, 15%, 20%, 25%, 30%, 35%.

Selected temperature is: 2° C. (35.6° F.).

Insufflation time is 20 minutes.

Area P' (E', $f'$, $g'$, $h'$) corresponding to Area P, is here bounded by portions of curves II and IV between the points $e'$, $h'$ and $f'$, $g'$, and the lines joining points $e'$, $f'$ and $h'$, $g'$.

Only the end points $a$ and $d$ of Area U are shown.

The insufflation rate is the ratio of the volume of the insufflated product to the volume of the product before insufflation.

According to curves plotted to correspond with the aforesaid conditions, the insufflation rate passes through a maximum value for a TDE of about 40% whatever the proportion of fatty substance contained in the dry extract, for the apparatus in question, that is for a given stirring and form of introducing the gas and discharging it in a manner equally stated.

Thus, for a given dry extract and corresponding proportion of fatty substances in relation to said dry extract, FIG. 2 shows the insufflation rate used under the aforesaid conditions in order to get the organoleptic properties and structure of the product of the invention, when using as component proportions entering into the formula, those shown in FIG. 1.

The insufflation rate varies between 1.4 and 2, as can be seen from an examination of that figure.

Of course, a great variety of gases can be used, provided they are inert, such as air, nitrogen, carbon dioxide, argon or similar gases.

As has already been stated above, the choice of the stabilizers necessary for maintenance in the "cool state" of the organoleptic properties, and especially the structure of the product obtained starting from the formulas of compounds and rates of insufflation aforesaid, is essential. These stabilizers are used in the following proportions:

(1) Anti-symeresis stabilizers such as gelatin, in a proportion ranging from 0.1 to 1% and preferably equal to 0.5%;
(2) Stabilizers guaranteeing the maintenance of the insufflated structure, such as vegetable gums, for example gum arabic, gum tragacanth, karaya gum, guar gum, pectins and/or alga extracts such as carragheenates or alignates, in a proportion of 0.2 to 1% and preferably in the proportion of 0.5%;
(3) Starchy products such as cereal flours, starches, feculas and derivatives in the proportion of 0.2 to 3% and preferably in the proportion of 1%.

To prepare the product of this invention, the aforesaid products are dissolved warm, with stirring, at a temperature of 90° C. (194° F.). The mixture is kept for a sufficient time at the 90° C. temperature to obtain perfect homogeneity and sterilization. Then, the product is insufflated by any suitable means, after which it is cooled in a cold chamber down to a temperture of +1 to +7° C. (34 to 45° F.), pH of mixture being above 5.5 and preferably between 6.5 and 7. The next step is the filling of the containers provided for distribution before setting of the stabilizers and storing the lactic product so obtained in its "cool state," that is, at a temperature of about +4 to 8° C. (39 to 47° F.).

The product is subjected to cold insufflation, that is, at a temperature less than 20° C. (68° F.) and preferably between 0 and +10° C. (32 and 50° F.) using an inert gas and an insufflating ratio between 1.4 and 2. Insufflation is effected by means of a Hobart beater-mixer or similar equipment furnished with compressed gas insufflation device or a "blender-insufflator" until the desired insufflation swell is obtained, then, as rapidly as possible, the product is filled into containers under the aforesaid conditions until distributing it.

According to another variant, the product is subjected to hot insufflation, that is, at a temperature higher than 20% C. (68° F.), which offers certain advantages as regards the delicacy of the product structure and improvement of its preservation, thanks to a partial destruction of bacteria more or less pronounced according to the temperature employed.

The following non-restrictive examples are given by way of illustration of the present invention:

EXAMPLE 1

Heat to 70° C. (158° F. in a Hobart mixer, stirring continually, a mixture containing 76 parts of a sterilized milk having fatty substance content of 113 grams/liter, 13.8 parts of saccharose, 7.1 parts of cerelose, 1 part starch, 0.05 part of substance known as "Lygomme," 0.15 part of carragheenates, 0.3 part of gelatin, 1.2 parts of product known as "Cafeol" and 0.3 part of soluble coffee extract known as "Nescafe." "Lygomme" is a dry product obtained from carragheen lichen extracts and galactomnnan extracts. "Cafeol" is a liquid coffee extract containing 29–36% solids and 1–3% caffeine.

After obtaining perfect dissolution and homogeneity, raise temperature to 90° C. (194° F.) and keep the mixture at that temperature for 10 minutes, with stirring. Then leave the mixture to cool and immediately store in a cold chamber.

Effect insufflation at 2° C. (36° F.) in the Hobart beater, introducing nitrogen until a volume swell of 1.72 has been obtained in 20 minutes.

Product characteristics indicated according to the component groups corresponding to FIGS. 1 and 2 are as follows:

| | |
|---|---|
| TDE, percent | 37.7 |
| ADS, percent | 29.2 |
| FS, percent | 8.5 |
| FS/TDE, percent | 22.7 |
| ADS/(water+ADS), percent | 32 |
| Insufflation rate | 1.72 |

This example gives a lactic product corresponding to point 2 on FIG. 1. This is a product that can be kept in a cool place, has excellent organoleptic properties and which, furthermore, can be frozen and thawed several times, always retaining its original structure. Eaten in the "cool state" it comes in the following form: a light, mellow molded shape. It does not "run" or flow below 10° C. (50° F.). Slightly fluid above that—sugary taste less pronounced than for point 1.

In the frozen state, the product comes in the following form: ice cream, easy to spoon up, light and melting when swallowed. Fine crystallization.

EXAMPLE 2

Proceed as in Example 1, but using a sterilized milk whose fatty substance content is 320 gram/liter with an insufflation ratio of 1.93.

Characteristics of the resultant product are as follows:

| | |
|---|---|
| TDE, percent | 52.1 |
| ADS, percent | 27.7 |
| FS, percent | 24.4 |
| FS/TDE, percent | 47 |
| ADS/(water+ADS), percent | 35.2 |
| Insufflation factor | 1.93 |

This gives a product which can be preserved in a cool place and still show good organoleptic properties, although its fitness for reversibility is slightly less favorable. This product corresponds to point 3 on FIG. 1. Eaten cool, it comes thus: light mass, very slippy and well molded—sugary taste less pronounced than for point 2—pure, fresh creamy taste. Eaten frogen, it comes in the following form: very fine crystallized ice cream. Very slippy, very resilient product. Very pronounced taste of fatty substance when swallowed.

EXAMPLE 3

Vanilla ice product

Proceed as in Example 1, but use the following proportions:

| | Percent |
|---|---|
| 3% powdered milk, 15 grams/liter FS | 52.5 |
| Fresh cream at 320 gram/liter FS | 24.5 |
| Vanilla essence | 0.4 |
| Saccharose | 14. |
| Cerelose (glucose) | 7.2 |
| Stabilizers: | 0.55 |
|    Starch (Fleurinex) | 0.85 |
|    Pectin, 0.1; carragheenate, 0.15; gelatin, 0.3. | |
|    Total | 100. |

Characteristics of the resultant product are as follows:

| | |
|---|---|
| TDE | 37 |
| FS | 8.5 |
| FS/TDE | 23 |
| Insufflation factor | 1.67 |

EXAMPLE 4

Chocolate ice product

Proceed as in Example 1, but use the following proportions:

| | Percent |
|---|---|
| Skim milk | 52. |
| Fresh cream at 320 gram/liter fatty content | 24. |
| Chocolate tablets (percentage) | 8. |
| Bitter (cooking) cacao | 1.2 |
| Saccharose | 9. |
| Glucose | 5. |
| Stabilizers: | 0.5 |
| Starch | 0.3 |
| Lygomme, 0.1; carragh., 0.2; gelatin, 0.2. | |
| Total | 100. |

Characteristics of resultant product are as follows:

| | |
|---|---|
| TDE | 37.7 |
| FS | 11.7 |
| FS/TDE | 31 |
| Insufflation factor | 1.87 |

What is claimed is:

1. An insufflated lactic product based on milk, fresh cream, sugars, coloring matter and essences, having an insufflation ratio of 1.4 to 2, and comprising in combination therewith, (a) a stabilizer against syneresis, in an amount ranging from about 0.1 to 1%; (b) at least one stabilizer ensuring maintenance of the insufflated structure, said stabilizer being a vegetable gum, a pectin or an alga extract in an amount of about 0.2 to 1%; and (c) at least one starchy substance in an amount of about 0.2 to 3% and wherein the weight ratio of fatty substances to total dry extract lies between about 10 and about 50% and the ratio by weight of absorbent dry substances to the total of absorbent dry substances plus water is about 30 to 50%.

2. A product according to claim 1, wherein the stabilizer against syneresis is present in an amount of 0.2 to 0.5%.

3. A product according to claim 1, wherein the stabilizer ensuring maintenance of the insufflated structure is present in an amount of 0.2 to 0.5%.

4. A product according to claim 1, wherein the starchy substance is present in an amount of 0.3 to 1%.

5. A product as claimed in claim 1, wherein the stabilizer against syneresis is gelatin.

6. A product as claimed in claim 1, wherein the stabilizer ensuring maintenance of the insufflated structure is a vegetable gum selected from the group consisting of gum arabic, gum tragacanth, karaya gum, or guar gum.

7. A product as claimed in claim 1, wherein the stabilizer ensuring maintenance of the insufflated structure is a pectin.

8. A product as claimed in claim 1, wherein the stabilizer ensuring maintenance of the insufflated structure is an alga extract selected from the group consisting of a carragheenate and an alginate.

9. A product as claimed in claim 1, wherein the starchy substance is a cereal flour, a starch or a fecula.

10. A method for preparing the product as claimed in claim 1 comprising mixing the ingredients while warm, insufflating the mixture at a temperature above 20° C. to obtain a volume swell factor of 1.4 to 2.0 and cooling the insufflated product to a temperature of about 1–7° C.

11. A method for preparing the product as claimed in claim 1 comprising mixing the ingredients while warm, insufflating the mixture at a temperature below between 0° C. and +10° C. to obtain a volume swell factor of 1.4 to 2.0 and cooling the insufflated product to a temperature of about 1–7° C.

References Cited

UNITED STATES PATENTS

| | | | |
|---|---|---|---|
| 2,097,225 | 10/1937 | Green et al. | 99—136 |
| 2,168,934 | 8/1939 | Haskins | 99—136 |
| 2,555,849 | 6/1951 | Glabe | 99—136 |
| 2,176,023 | 10/1939 | Musher | 99—136 |

RAYMOND N. JONES, Primary Examiner

J. M. HUNTER, Assistant Examiner

U.S. Cl. X.R.

99—139